United States Patent [19]

Barwick, III et al.

[11] 3,916,044

[45] Oct. 28, 1975

[54] METHOD FOR IMPROVING THE FLAME RETARDANCY OF SYNTHETIC LINEAR POLYESTERS

[75] Inventors: Frederick E. Barwick, III, Charlotte; Vernon C. Smith, Huntersville, both of N.C.

[73] Assignee: Collins and Aikman Corporation, New York, N.Y.

[22] Filed: Dec. 21, 1970

[21] Appl. No.: 100,379

[52] U.S. Cl. .................. 427/335; 427/428; 428/96; 428/260; 428/272; 428/921
[51] Int. Cl.² ...................... C09D 5/18; C09K 3/28
[58] Field of Search ......... 117/136, 138.8 F, 62, 63, 117/65.2; 427/335, 428; 428/96, 260, 272, 921

[56] References Cited
UNITED STATES PATENTS

| | | | |
|---|---|---|---|
| 2,438,366 | 3/1948 | Illingworth | 117/119.8 X |
| 2,590,849 | 4/1952 | Dungler | 117/119.8 X |
| 2,590,850 | 4/1952 | Dungler | 117/119.8 X |
| 2,662,834 | 12/1953 | Paist et al. | 117/136 X |
| 2,953,480 | 9/1960 | Barnell | 117/137 |
| 2,991,143 | 7/1961 | Rosenlind | 117/136 X |
| 3,073,721 | 1/1963 | Pokorny | 117/119.8 X |
| 3,093,599 | 6/1963 | Mueller-Tamm et al. | 260/2.5 |
| 3,339,526 | 9/1967 | Bradley et al. | 117/63 X |
| 3,398,016 | 8/1968 | Goldman et al. | 117/138.8 X |
| 3,412,052 | 11/1968 | Taylor et al. | 117/136 X |
| 3,582,388 | 6/1971 | Stayner | 117/27 |

FOREIGN PATENTS OR APPLICATIONS

| | | | |
|---|---|---|---|
| 973,355 | 10/1964 | United Kingdom | 117/136 |
| 817,366 | 7/1969 | Canada | 117/136 |
| 1,100,605 | 1/1968 | United Kingdom | 117/137 |
| 1,191,569 | 4/1965 | Germany | 117/136 |

OTHER PUBLICATIONS

Barber et al., "A Study. . .", Am Dye Rptr, May 6, 1968, pp. 40–44.

Primary Examiner—Harry J. Gwinnell
Attorney, Agent, or Firm—Paul & Paul

[57] ABSTRACT

Flame resistant polyester products are provided which are obtained by applying to the polyester a solution of a flame retardant in a solvent such as a halogenated aliphatic or aromatic hydrocarbon and then heating the polyester to an elevated temperature above the boiling point of the solvent, but below the boiling point of the flame retardant and the shrink point of the polyester. The treated polyesters obtained in accordance with the process of this invention exhibit excellent flame retardance which is durable to both laundering and dry cleaning.

10 Claims, No Drawings

3,916,044

METHOD FOR IMPROVING THE FLAME RETARDANCY OF SYNTHETIC LINEAR POLYESTERS

BACKGROUND OF THE INVENTION

1. Field of the Invention

This invention relates to an improved process for imparting flame retardancy to synthetic linear polyester fibrous materials.

2. Description of the Prior Art

Synthetic linear polyester fibrous materials have certain inherent physical properties which makes them highly useful in the manufacture of various items including garments, drapes, floor coverings, etc. The polyester fibers are strong, resilient, and have excellent wearing properties. However, the polyesters also have certain properties which present serious problems in many applications. The polyesters, before any treatment is applied to them, will readily burn. In addition, the inherent flammability of the polyesters is often further increased by certain types of conventionally used treating processes. For example, polyesters are inherently difficult to dye. Accordingly, in order to improve the dyeability certain organic compounds, many of which themselves are highly flammable, are used as carriers to assist in the dyeing process. Minor amounts of these organic compounds remain adhered to the polyester fibers after dyeing which further increases the flammability of the dyed fibrous polyester materials.

The problem of flammability of polyesters is especially acute in loosely woven goods, light weight goods, and in particular, in fabrics having a pile such as synthetic furs and carpeting. With reference to carpeting, certain types of constructions of carpeting such as the shag type carpeting are especially flammable. The low density pile of shag carpeting provides an ideal set of conditions for ignition of the polyester materials if an article such as a burning match, a lit cigarette or the like is dropped onto the shag carpeting. Carpeting, having a high degree of flammability, is of course highly undesirable for most applications and is especially unsuitable for use in public buildings such as hospitals, bowling alleys, nursing homes, movies and the like.

Various tests are used to determine the relative flammability of fabrics used in a vertical position. These test methods generally consist of hanging a strip of the fabric in a vertical position and then igniting the strip with a flame. The flame is then removed after a predetermined period of time and the flammability is then evaluated. It is initially determined if the fabric will support a flame after removal of the ignition means or whether it is self extinguishing. The area burned as a result of the test and the length of the after glow are likewise measured.

The determination of the flammability of fabrics which are generally employed in a horizontal position such as carpeting is not quite as well developed as the test for fabrics generally used in the vertical position as described above. The physical conditions under which carpeting is employed is quite different from that in which garment fabrics are used. The effect of the surrounding atmosphere and the heat generated by burning materials is quite different for vertically positioned fabrics than for horizontally positioned fabrics. Accordingly, the flammability test results using conventional vertical test methods are not always relevant with regard to the fabrics, for example, carpeting which are almost always used in the horizontal position.

Various methods have recently been suggested to test carpeting and the like for flammability. One such test method has recently been established by the Commerce Department under the Flammability Act which test method is likewise approved by ASTM. This method consists of placing a methenamine pill in the center of eight different nine inch square samples of a given carpet and igniting the pills. If more than one of the test samples burns more than 3 inches in any direction before extinguishing itself, the carpet is considered to have failed to meet the established standard.

In general, it should be appreciated that untreated polyesters fail when tested in either the vertical or horizontal position. The failures are much more marked as noted above in light weight goods, loosely woven fabrics and in low density pile fabrics. The failure of untreated polyester carpeting and especially shag carpeting which has previously been dyed with a flammable organic dye carrier is often quite surprising as the carpeting will often burst into a violent flaming mass until completely consumed by the flames.

Many different suggestions have been made in the prior art to improve the flame retardancy of polyester fabrics and especially carpeting. These methods for the most part have consisted of applying either a borate, phosphate, or phosphite compound to the polyester material to be treated. The various types of flame retardants heretofore suggested are well known to those skilled in the art. In general, relatively large amounts of the flame retardant materials had to be applied to the polyester fabrics in order to obtain a substantial reduction in flammability of the materials. Amounts of from 10–25 percent based on the weight of the fiber were considered to be the minimum amount required. The polyester fibers are difficult to impart flame resistance to because of the combination of inherent flammability and inherent lack of reactive positions for attaching flame proofing agents. Certain of the processes suggested in the prior art such as using water emulsions of the flame retardants resulted in at best a temporary surface treatment which could readily be removed by normal wear or by either washing or dry cleaning. The cost of flame proofing polyester materials added substantially to the cost of the final product and the resulting improvement in fire resistance was often at best only marginal. Furthermore, the use of relatively large amounts of the flame retardants often had a noticeable adverse effect on the hand of the treated polyester materials. The flame retardants imparted a dry, course hand to the fabrics. In addition, most flame retardants can be removed with mild washing and have to be applied after dyeing which further complicates the finishing of the fabrics.

It is accordingly an object of this invention to overcome the aforementioned problems and difficulties encountered in the prior art processes for imparting flame resistance to polyester fibrous materials. It is an additional object of this invention to provide an improved process for imparting permanent flame resistance to polyester fibrous materials.

It is a still more specific object of this invention to provide a process for imparting flame resistance to polyesters which will be more durable and also more economical to apply than those heretofore available.

3

A further object of this invention is to provide polyester pile fabrics having improved flame resistance.

Other objects and advantages of this invention will become further apparent hereinafter and from the continued reading of the specification and sub-joined claims.

SUMMARY OF THE INVENTION

The objects of this invention are achieved by applying a flame retardant which may be selected from various classes of flame retardants including the phosphates and phosphites to the polyester in the form of a solution in an organic solvent. The polyester is then treated at an elevated temperature substantially above the boiling point of the solvent, but below the shrink point of the polyester material so as to remove substantially all of the solvent from the polyester. The flame proofing agent will then be distributed uniformly and physically entrapped throughout the entire volume of the polyester and cannot be removed in any substantial amounts by subsequent lower temperature treatments such as dyeing, laundering or dry cleaning.

DESCRIPTION OF THE PREFERRED EMBODIMENTS

The polyester fibrous materials which are treated in accordance with the present invention are made from synthetic linear polyesters which are the condensation polymerization products of dicarboxylic acids and polyhdric alcohols. The repeating structural units of the polymer chain include at least one divalent carbocyclic ring containing at least six carbon atoms which is present as in integral part of the polymer chain and having a minimum of four carbon atoms between the points of attachment of the ring in the polymer chain. The preferred synthetic linear polyesters are the high molecular weight polyethylene terephthalates. Other types of polyesters are likewise employable such as those obtained by polymerizing other dicarboxylic acids such as bromoterephthalic acid, 4,4'-benzophenonedicarboxylic acid and so forth with glycols such as those of the formula HO—(CH$_2$)$_n$—OH, wherein n is a whole number from 2–10 such as diethylene glycol, neopentylene glycol and the like.

The polyester fibrous materials, when treated in accordance with this invention, may be in various forms. The polyester fibers may be treated as continuous filaments, or as chopped tow. The fibers may also be spun into yarns or woven into fabrics and then treated. When referring to yarns, this is intended to include filament yarns, spun yarns, and the like. The term fabric, as used in the specification, is intended to include knitted fabrics, woven fabrics, non-woven fabrics and especially pile fabrics in general whether obtained by knitting, weaving, tufting or the like. The term pile fabric includes both garment type pile fabrics such as fake furs and the like and carpeting and the like. The yarns and fabrics that are treated according to this invention preferably consist of only polyester fibers. However, it is also possible to treat polyesters in blends with other fibers by the present invention providing the other fibers are not adversely affected by the process of this invention.

In accordance with the teachings of this invention, a flame retardant for the polyester is dissolved in organic solvent having a lower boiling point than that of the flame retardant. The solution of the flame retardant is applied to the polyester and the material is given a heat treatment at an elevated temperature higher than that which will thereafter be encountered by the polyester material and above the boiling point of the solvent. The heat treating temperature is however maintained below the boiling point of the flame retardant and below the shrink point of the polyester. The flame retardant and possibly minor amounts of the solvent are distributed throughout the entire volume of the polyester fibrous materials.

The flame retardant agent used in the present invention can be selected from generally well known classes of flame retardants such as the polyhalogenated phosphates, phosphites and so forth. The flame retardant should have certain properties which are important in order to obtain the maximum benefits in the process of this invention. The flame retardant should be substantially completely soluble in a solvent of the type which will be described below. The flame retardant should have a boiling point above 100°C and more especially above 120°C. More especially, the flame retardant should have a boiling point above the boiling point of the solvent employed to dissolve the flame retardant. If however, the flame retardant is to be applied after dyeing, a flame retardant can be used which has a boiling point below 100°C, but above that at which the fabric will thereafter be subjected. For example, if the treated fabric will only be subjected to home laundry, it should have a boiling point above 60°–85°C, which is the maximum temperature normally encountered in home laundering.

The preferred class of flame proofing agents utilized in this invention are the organic halogenated phosphates and phosphites. There is a large, well known class of compounds of this type which are commercially available. A typical class of compounds suitable for use in this invention are the halogenated alkyl phosphates which are represented by the following formula

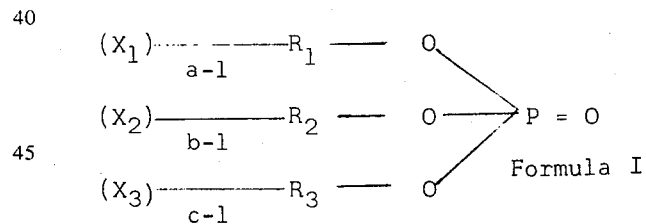

Formula I wherein R$_1$ to R$_3$ are the same or different and each is a lower alkyl radical having up to seven carbon atoms and X$_1$ to X$_3$ are the same or different and each stands for a halogen such as fluorine, chlorine, bromine or iodine and a, b and c are whole numbers from 1 to 4 with the total of a + b + c being at least 6. A typical compound of this classe which has proven to be especially useful is tris(2-3-dibromopropyl) phosphate which is represented by the formula

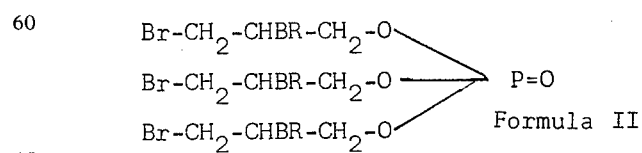

Formula II

The corresponding compounds of this class, for example, tris(betachloroethyl) phosphate likewise has proven to be most effective in the process of this invention. Various other well known types of alkyl phosphates and phosphites can likewise be utilized to advantage in this invention. Since the phosphate and phosphite flame retardants are well known to those skilled in the art to enumerate each in this specification would serve no useful purpose since the present invention resides primarily in the novel method of application of the flame retardant and not in the flame retardant per se.

In addition to the phosphate and phosphite flame retardants, it should be appreciated that other classes of flame retardants can likewise be used. For example, certain highly halogenated hydrocarbons such as hexabromobiphenyl, the corresponding chlorinated product thereof, and the like are also useful. Additional classes of similar types such as the halogenated biphenyl oxides such as hexabromobiphenyl oxide can likewise be used to advantage in the process of the present invention.

The solvent used to dissolve the flame retardant should preferably be a halogenated aliphatic or aromatic hydrocarbon. The halogenated hydrocarbon solvents are preferred since they are highly effective solvents for flame retardants due to their similarity in structure, since both are halogenated. Furthermore, when halogenated solvents are employed, any residual amount left on the polyester does not substantially increase the flammability of the polyesters and may, in fact, in combination with the flame retardant, increase the flame retardancy of the polyester and also improve certain other properties. The lower halogenated aliphatic solvents (1 – 7 carbonations) are preferred, with the halogenated $C_2$ hydrocarbons being the most preferred type. This class includes, for example, trichloroethanes such as 1,1,1-trichloroethane, and 1,1,2-trichloroethane, tetrachloroethanes, perchloroethylene and the like. The halogenated ethanes and ethylenes are especially useful because of their high solvency property and their relatively low boiling points. Furthermore, these compounds are commercially available at relatively low costs. The halogenated aromatic hydrocarbons can likewise be utilized to considerable advantage in certain embodiments of this invention. Because of their higher boiling point which permits the use of higher treating temperatures. The halogenated aromatic hydrocarbons which are preferably employed in the present invention may be monocyclic or bicyclic hydrocarbons with the monocyclic hydrocarbons being most preferred. The halogenated aromatic hydrocarbon solvents are represented by the formula

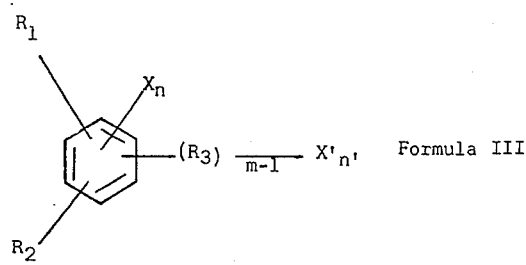

Formula III wherein $R_1$ and $R_2$ are the same or different and each represents hydrogen, an alkyl having 1 to 4 carbon atoms such as methyl, ethyl, n-propyl, isopropyl, and n-butyl or an alkenyl having 2 to 4 carbon atoms such as vinyl, 1-propenyl and 2-butenyl. When $R_1$ and $R_2$ are attached to vicinal carbon atoms they may be attached to each other to form a five to six membered aliphatic or aromatic ring when taken together with the vicinal carbon atoms of the aromatic ring of the compound of Formula III, with the naphthalene ring system being the preferred ring system when $R_1$ and $R_2$ are joined together. $R_3$ is a lower alkylene radical having 1–4 carbon atoms such as methylene, ethylene, propylene or butylene or an arylene radical, preferably a phenylene radical such as 1,4-phenylene. X and X' in Formula III stands for the same or different halogens such as fluorine, chlorine, bromine or iodine and n and m are whole numbers from one to three and when n or m is two or more X or X' respectively can stand for the same or different halogens.

The preferred class of halogenated aromatic hydrocarbons of Formula III for employment in this invention are halogenated benzenes and halogenated lower alkyl benzenes. More preferably are the mono- di- and especially trihalogenated benzenes. Particular attention is directed to compounds such as 1,2-dichlorobenzene, 1,3-dichlorobenzene, 1,4-dichlorobenzene, 1,2,3-trichlorobenzene, 1,2,4-trichlorobenzene and 1,3,5-trichlorobenzene.

The halogenated aromatic hydrocarbons have been found to be highly effective solvents for certain alkyl phosphates flame retardants which are otherwise somewhat difficult to dissolve. Using these solvents in relatively low amounts, a concentrated solution of the flame retardant can be prepared which then can be diluted to the desired concentration with an aliphatic solvent such as perchloroethylene.

The use of a combination of solvents such as a lower boiling halogenated aliphatic solvent and a higher boiling aromatic solvent such as trichlorobenzene can have several advantages in addition to that noted above. By using a mixture containing a major amount of the lower boiling solvent, the major portion of the solvent can be removed at lower temperatures, thereby reducing the energy required for the practice of the process of the present invention while still allowing a sufficient amount of the higher boiling solvent to remain so that a high treatment temperature can be utilized. In addition, by using a mixture, it is possible to regulate the process so that a controlled amount of the higher boiling halogenated aromatic hydrocarbon remains in the treated material. The minor amount of the entrapped solvent can improve the flammability in combination with the flame retardants and also improve the dyeability and other properties of the treated polyester material.

In accordance with the process of this invention, the flame retardant is initially dissolved in the solvent. A sufficient amount of solvent must be employed to completely dissolve the flame retardant. In general, it is preferable to utilize a relatively dilute solution of the flame retardant with about 10 percent by weight of the flame retardant in the solvent giving the most optimum results.

The solvent solution is applied to the polyester to be treated. This can be done by conventional methods with equally satisfactory results. For example, the solvent solution can be sprayed on or padded onto the fabric. The amount of the active fire retardant applied will vary according to the particular flame retardant employed, the weight per square yard of the goods, the construction of the fabric and the relative improvement in retardancy required in the final product.

After application of the solvent solution, the treated polyester is heated to a temperature above the boiling point of the solvent, but below the boiling point of the flame retardant and the shrink point of the polyester. The removal of the solvent is most effectively conducted by utilizing super heated vapors of the solvent which are heated about 20°–40°C above the boiling point of the solvent. The vaporization of the solvent at a high temperature is believed to assist the penetration of the flame retardant into the polyester. The removal of the solvent can also effectively be conducted in a conventional oven but is most preferably conducted in apparatus such as a degreaser of the type commonly employed in the metal cleaning art.

It is important to note that when utilizing the process of this invention, that a considerably lower amount of the flame retardant needs to be employed as compared to the prior aqueous dispersion in order to obtain a given increase in flame resistance. Generally, only one-third to one-half the add-on amount of flame retardant need be employed in order to obtain the same initial flame retardancy as is obtained with the conventional methods. In addition, the treatment of this invention is resistant to laundering and dry cleaning and is not physically removed by wear or vacuuming in amounts sufficient to substantially effect the flame retardancy of the treated polyester.

The following examples are given by way of further illustration of the present invention and are not intended to limit in any way the scope of the present invention beyond that of the sub-joined claims. All parts and percentages are parts and percentages by weight, not volume, unless otherwise indicated.

EXAMPLE 1

In order to fully evaluate the effect of the process of the present invention on improving flame resistance, a greige tufted shag carpeting was used as the test material. This material had a face pile of polyethylene terephthalate yarn and a burlap backing. In order to prevent adding additional variables to the test, the backing was not coated with a rubber latex or the like as would customarily be employed in the preparation of carpeting.

Test samples of the above-described carpeting having a polyethylene terephthalate fiber pile was padded at 100 percent pick-up with the following compositions.

| Sample | 1,2,4-trichloro benzene | tris(2,3-dibromopropyl) phosphate | perchloroethylene |
|---|---|---|---|
| 1. (blank) | 0 | 0 | 0 |
| 2. (emulsion) | 0 | 10 | 0 |
| 3. (emulsion) | 0 | 15 | 0 |
| 4. (emulsion) | 0 | 20 | 0 |
| 5. | 0 | 2 | 98 |
| 6. | 0 | 3 | 97 |
| 7. | 0 | 5 | 95 |
| 8. | 0 | 6.7 | 93.3 |
| 9. | 0 | 10 | 90 |
| 10. | 0 | 12 | 88 |
| 11. | 2 | 0 | 98 |
| 12. | 2.5 | 7.5 | 90 |
| 13. | 2.0 | 10 | 88 |
| 14. | 3.0 | 10 | 87 |
| 15. | 3.0 | 15 | 82 |
| 16. | 2.0 | 18 | 80 |

The blank was given a water rinse and dried at 210–230°F. in a forced air oven. The emulsions of tris(2,3-dibromopropyl) phosphate were padded on and dried at 210°–230°F in a forced air oven.

Samples 5–6 after padding were passed through a chamber containing super heated vapors of perchloroethylene maintained at 144°C for 60 seconds which removed all of the perchloroethylene except for very minor residual amounts trapped in the samples. Each sample was assayed and was found to contain ± 1 percent of the estimated amount of the padded on flame retardant.

The test of flammability was conducted in accordance with the published federal specification DD-C-95. Since this test is described in detail in the published federal specification, the test method is incorporated by reference into the specification and is not described in detail in this or the following examples. The test is, however, briefly described above being the test employed using the methenamine pill.

Eight 9 inch square portions of each sample was evaluated. All samples of No. 1 failed badly in this test having burned in a vigorous non-controllable manner. Sample 2 exhibited a somewhat minor improvement in flame resistance but was still very poor in flame resistance. Sample 3 was marginal with regard to the flame resistance with one sample out of the eight failing. Sample 4 passed the test without any difficulty. Samples 5, 6 and 7 failed but showed a definite improvement in flame retardancy with an increase in the amount of the flame retardant employed. Samples 8–10 and 12–16 all passed the test without any difficulty. Sample 11 failed, but was somewhat better in flame retardancy than Sample 1.

EXAMPLE 2

Portions of Samples 1–16 were washed in a commercial washing machine with a commercially available detergent (Tide) at 140°F and tumble dried. The samples were retested for flammability. Samples 1–7 and 11 failed the flammability test while Samples 8–10 and 12–16 passed the test. Samples 2, 3 and 4 were for all intents and purposes, equivalent to the initial untreated sample showing that the emulsion applied flame retardants are not resistant to laundering.

Additional portions of Samples 1–16 were dry cleaned with perchloroethylene at 25°C. Substantially equivalent results were obtained as in the laundry test when the samples were thereafter evaluated for flame resistance.

EXAMPLE 3

Samples of each of the carpetings prepared in Example 1 were dyed in a dye bath comprised of 1.0 percent OWF (by weight of fiber) CI Disperse Blue 27

0.5 percent OWF Sodium Acetate in a 30:1 liquor ratio at 90°–100°C for 30 minutes. The samples were rinsed and dried.

Samples 1–4 showed no signs of dyeing being at most stained a pale blue.

Samples 5–9 dyed a light shade of blue, but clearly did not readily accept the dyestuff.

Samples 11–16, however dyed a full deep shade of blue and the dyebaths were completely exhausted. Samples 11–16 were thereafter evaluated for flame retardancy. Sample 11 failed. Samples 8–10 and 12–16 passed the flame retardancy test without any difficulty.

EXAMPLE 4

Example 1 was repeated except that a tufted carpeting having approximately twice the pile density was employed. This carpeting had the same weight per square yard as that used in Example 1 with the pile being shorter and therefore denser than the samples employed in Example 1. As was expected, a lesser amount of flame retardant was required to be applied in accordance with the process of this invention in order to obtain adequate flame retardancy. It was found that amounts as low as 4.5–5 percent OWF of the flame retardant, tris(2,3-dibromopropyl(phosphate), gave highly satisfactory results.

EXAMPLE 5

Example 1 was repeated except that hexabromobiphenyl was employed as a flame retardant with equivalent results being obtained with regard to improvement in the flame resistance.

EXAMPLE 6

Example 1 was repeated with the exception that the following solvents were employed in equivalent amounts 1,1,2-trichloroethane 1,1,2,2-tetrachloroethane 1,1,1,2,2-pentachloroethane 1,1-dichloro 2-bromoethane chlorohexane 1,2-dichlorohexane 1-chloroheptane The solvents were applied along with 6.7 percent OWF of tris(2,3-dibromopropyl)phosphate. All samples pass the flame retardancy tests DDD-C-95.

EXAMPLE 7

A tufted carpet sample made of polyethylene terephthalate fibers, commercially known as Dacron was allowed to pass through a pad bath of the following composition:

10.0 percent hexabromobiphenyl 90.0 percent perchloroethylene

Pickup was adjusted to 100 percent by regulation of the squeeze rollers. The sample was then placed in a chamber containing perchloroethylene vapors maintained at 140°C for a period of 90 seconds in order to remove the perchloroethylene. The sample was assayed and found to contain approximately 10.0 percent OWF of hexabromobiphenyl.

The treated carpet sample was dyed at 99°–100°C for ½ hour in a 25:1 liquor ratio dyebath of the composition described in Example 3. After dyeing, the carpet was thoroughly washed with water at 30°C in order to remove any unfixed dyestuff. The carpet was dyed a full shade of blue. The carpeting also passed the Federal Specification DDD-C-95 flammability standard.

EXAMPLE 8

In order to determine the effect of any entrapped solvent in the polyester fibers on the flame retardancy when applied along with a conventional flame retardant, a pile fabric made of polyethylene terephthalate fibers was treated according to the process described in Example 1. The samples were evaluated for flammability according to ATTCC test method 34-1969.

| Sample | Seconds Burning After Ignition |
|---|---|
| 1. Blank | 102 |
| 2. 4.3 OWF tris—(2,3-dibromopropyl)phosphate | 61 |
| 3. 4.3 OWF tris—(2,3-dibromophosphate) .85 OWF 1,2,5-trichlorobenzene | 50 |

It can be seen that in this test that the minor amounts of the trichlorobenzene present reduce the burning time by 14.9 percent over the sample containing only the tris-(2,3-dibromopropyl) phosphate. This decrease in burning time is very important in case of an actual fire as it will reduce the time during which the fire is active and thereby reduce the resulting danger and damage caused by the fire.

What is claimed is:

1. In the method of increasing the flame retardancy of a fibrous synthetic linear polyester in which a halogenated organic flame retardant is applied to said polyester, the improvement which comprises the steps of (1) dissolving the halogenated organic flame retardant in an organic solvent which boils at a temperature below the boiling point of said flame retardant and the shrink point of said polyester, (2) applying the resulting organic solvent solution of said flame retardant to said fibrous polyester in a flame retardant effective amount, and (3) thereafter exposing said fibrous polyester and applied solvent solution to superheated vapors of said solvent in an enclosed chamber until said liquid solvent is substantially removed from said fibrous polyester, whereby said effective amount of flame retardant is uniformly distributed and physically entrapped throughout said fibrous polyester.

2. The method according to claim 1 wherein the superheated solvent vapors are heated to a temperature in the range of about 20°–40°C above the boiling point of the solvent.

3. The method according to claim 1 wherein said solvent contains about 10 percent by weight of said flame retardant.

4. The method according to claim 1 wherein said flame retardant is represented by the formula

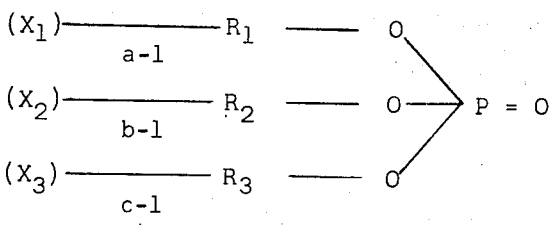

wherein $X_1$, $X_2$ and $X_3$ are the same or different and each stands for a halogen selected from the group consisting of fluorine, chlorine, bromine or iodine; $R_1$, $R_2$ and $R_3$ are the same or different and each stands for a lower alkyl having up to 7 carbon atoms and a, b and c are each whole numbers from 1–4 with the sum of a+b+c being at least 6.

5. The method according to claim 1 wherein said solvent is a halogenated aliphatic hydrocarbon solvent.

6. The method according to claim 1 wherein said solvent is a halogenated $C_2$ hydrocarbon.

7. The method according to claim 1 wherein said solvent is a halogenated aromatic hydrocarbon of the formula

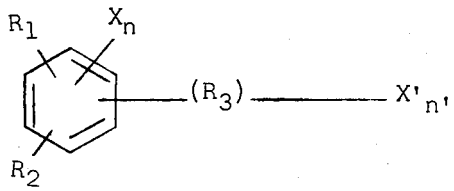

wherein $R_1$ and $R_2$ are the same or different and each represents a member selected from the group consisting of hydrogen, an alkyl having 1 to 4 carbon atoms, an alkenyl having 2 to 4 carbon atoms, and $R_1$ and $R_2$ when attached to vicinal carbon atoms and to each other stands for a five to six membered aliphatic or aromatic ring when taken together with the vicinal carbon atoms; $R_3$ is a member selected from the group consisting of lower alkylene having 1–4 carbon atoms and a monocyclic arylene radical; X and X' stand for the same or different halogens; n and m are whole numbers from one to three and when n or m is two or more X or X' respectively can stand for the same or different halogens.

8. The method according to claim 7 wherein a minor amount of said halogenated aromatic hydrocarbon is entrapped in said polyester along with said flame retardant, said minor amount being an amount sufficient to further increase the flame retardancy of said flame retardant.

9. The method according to claim 1 wherein said solvent is a halogenated benzene.

10. The method according to claim 1 wherein said solvent is a mixture of a lower boiling halogenated aliphatic hydrocarbon and a higher boiling halogenated aromatic hydrocarbon.

* * * * *